US000001246H

United States Statutory Invention Registration [19]

[11] Reg. Number: H1246

Huffaker et al.

[43] Published: Nov. 2, 1993

[54] BUOYANT CABLE TETHER

[75] Inventors: Roger W. Huffaker; Roald T. Lokken, both of Houston; Neil C. Nolop, Bellaire, all of Tex.

[73] Assignee: Exxon Production Research Company, Houston, Tex.

[21] Appl. No.: 68,015

[22] Filed: May 26, 1993

[51] Int. Cl.[5] ..... E02D 5/34; E02D 5/54

[52] U.S. Cl. ..... 405/223.1; 114/264; 405/224.3

[58] Field of Search ..... 405/223.1, 224.3; 114/264

*Primary Examiner*—David H. Brown
*Attorney, Agent, or Firm*—K. A. Bell

[57] ABSTRACT

A tether for securing a buoyant structure to the ocean floor. The tether includes a cable or a plurality of cables whose weight is at least partially supported by a buoyancy tank.

5 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BUOYANT CABLE TETHER

FIELD OF THE INVENTION

The present invention relates generally to tethers for securing a tension leg platform to the ocean floor. Specifically, but not by way of limitation, the present invention pertains to a tether in which the primary tension element comprises one or more cables and includes a buoyancy means to offset at least a portion of the weight of the tether.

BACKGROUND OF THE INVENTION

Platforms used in offshore petroleum production have traditionally been designed to resist wind, wave, and current environmental forces in a rigid, generally immobile, manner. In contrast, the relatively new tension leg platform concept (hereinafter referred to as the "TLP") is an offshore structure designed to react to environmental forces in a compliant, responsive manner. Characteristically, a TLP's main body, the "hull", is buoyant and floats on the water's surface. The hull is anchored to foundation units on the ocean floor by a set of substantially vertical tethers. The tethers maintain the hull in position above the subsea wells and partially restrain its response to the environmental forces.

The length of each tether is precisely determined to ensure that the hull floats at a somewhat deeper draft than if the TLP were unrestrained. As a result, the hull's buoyancy exerts an upward load on the tethers, thereby placing the tethers in tension. When the hull is acted upon by the environment, its compliant response affects its buoyancy, which in turn affects the tension in the tethers. The resulting cyclic variations in the tension and bending stresses in the tethers is an important consideration in TLP design.

The key analytic issue which arises from these stress variations is tether fatigue life. Generally speaking, both larger amplitude stress cycles and frequent repetitions of cycles of all amplitudes lower the expected life of a tether. Optimum tether design focuses on minimizing these undesirable occurrences.

A typical TLP has one or more tethers, which are typically made of elongated tubing sections, at each corner of its hull. The sections are joined to each other by mechanical connectors or by welding. As offshore petroleum production operations progress into deeper waters, connecting adjacent sections of tubing becomes increasingly difficult. Therefore, optimum TLP design utilizes as few tethers as possible both to minimize tether cost and weight and to reduce installation complications. However, the use of fewer tethers necessitates tether designs with large diameters and thick walls, each of which tend to reduce tether fatigue life. Alternate tether designs are needed to lessen the TLP designers' constraints between cost, weight, and installation considerations on one hand and fatigue life on the other hand.

Tether design is also sensitive to water depth. As water depth increases, longer tethers are required. With increasing length, tethers are exposed to more severe resonant loading, which is the response to a periodic driving force (e.g., waves and/or winds) which has a frequency approximately equal to the natural undamped frequency of the tether. That resonant response increases the risk of damage to or loss of the tether. Loss of a tether would increase loads on the remaining tethers, thereby posing a substantial risk of damage to the entire TLP. Alternate tether designs are needed to lessen or eliminate that risk.

For these reasons, therefore, a need exists for a TLP tether which minimizes the necessity for connecting numerous segments of tubular piping, which reduces the fatigue life constraints placed on the designer by existing tether designs, and which reduces the overall weight of the tethers.

SUMMARY OF THE INVENTION

The present invention is a TLP tether comprising one or more cables and a buoyancy tank designed to compensate for at least a portion of the weight of the tether. Top and bottom transitional pieces secure the tether to the TLP's buoyant hull and the foundation unit, respectively.

In one embodiment of the present invention, the tether utilizes a single cable (which may comprise one or more cable segments connected end-to-end) attached to the buoyancy tank and to the bottom transitional piece. In another embodiment of the present invention, the tether has a plurality of substantially parallel cables, a buoyancy tank, and an attachment assembly. The plurality of cables is attached to the buoyancy tank and to the attachment assembly. The attachment assembly is connected to the bottom transitional piece, which is connected to the foundation unit.

BRIEF DESCRIPTION OF THE DRAWINGS

The advantages of the present invention will be more easily understood by referring to the following detailed description and the attached drawings where.

Although the invention will be described according to its preferred embodiments, such descriptions shall not limit the invention. Accordingly, the invention is intended to encompass all alternatives, modifications, and equivalents which may be included within the spirit and scope of the invention, as defined in the appended claims.

DETAILED DESCRIPTION OF THE INVENTION

The present invention is a buoyant cable tether, comprising a single cable or a plurality of substantially parallel cables, at least partially supported by a buoyancy tank.

The invention is described and illustrated herein as an apparatus to secure a TLP to the ocean floor. However, the invention may encompass other embodiments and a variety of alternative uses. To the extent that the following detailed description is specific to a particular embodiment or a particular use, it is intended only as illustrative and is not intended to limit the invention.

Figure 1:
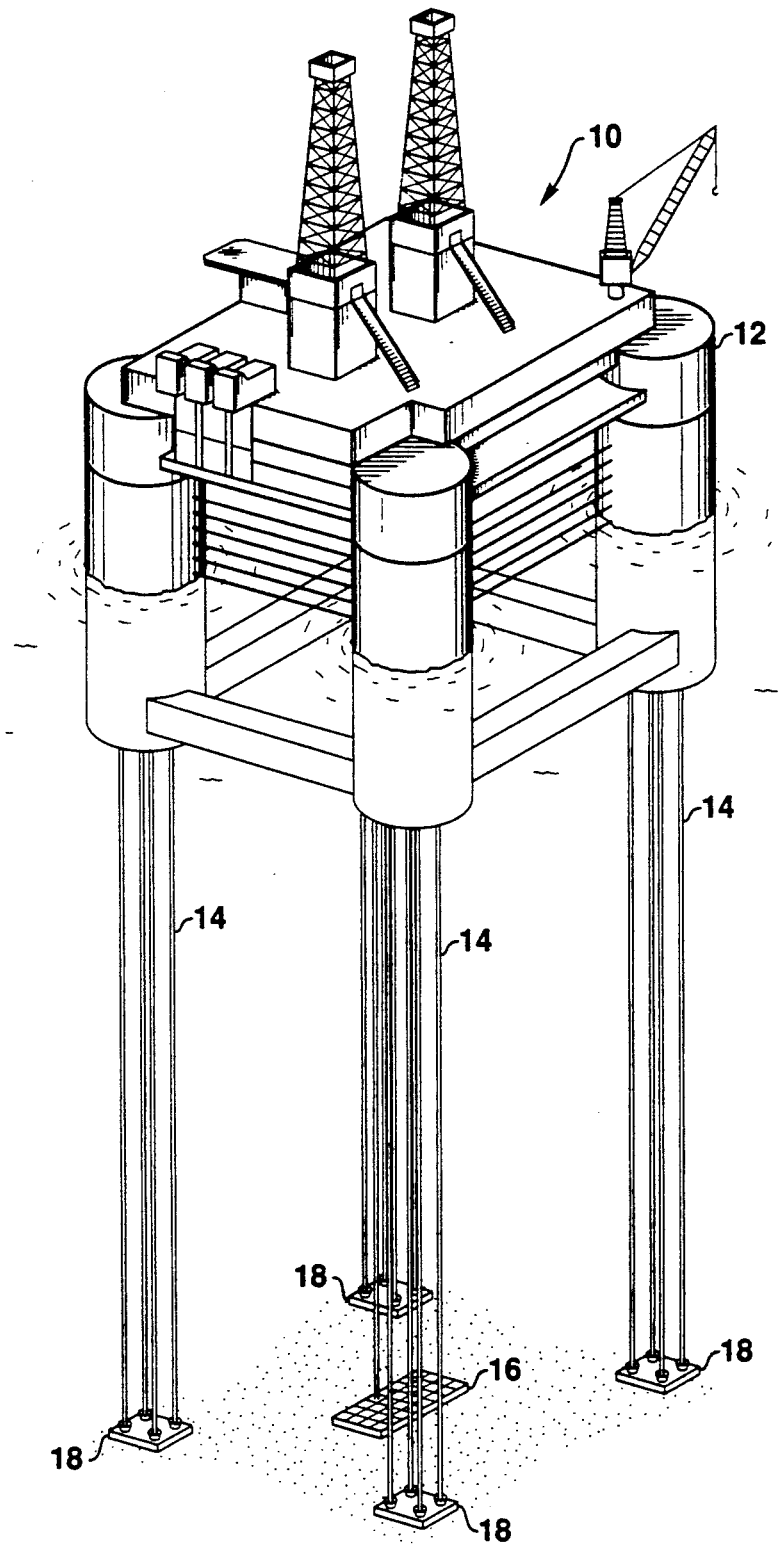
FIG. 1 is a perspective view of a typical TLP.

A typical TLP, as indicated at 10 in FIG. 1, consists of a buoyant hull 12 which is secured to the seafloor and held in position above the subsea well template 16 by a plurality of tethers 14. The tethers 14 extend vertically downward to foundation units 18 which are secured to the sea floor.

Figure 2:
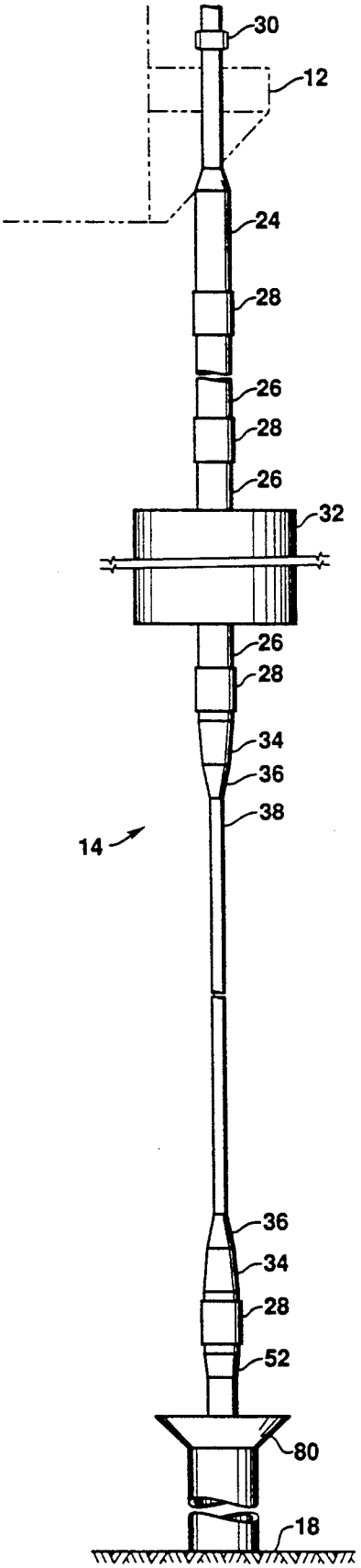
FIG. 2 illustrates the single cable embodiment of the present invention.

A first embodiment of the present invention utilizes a single cable, as shown in FIG. 2. The principle elements of the single cable tether 14 are a top transitional piece 24, one or more tubular pipe segments 26, a buoyancy tank 32, cable 38, and a bottom transitional piece 52. Cable 38 may be a single cable segment or a plurality of cable segments joined end-to-end, as more fully described below.

The upper end of the top transitional piece 24 is connected to the buoyant hull 12 by conventional means such as top connector 30. The lower end of the top transitional piece 24 is joined to the upper end of a tubular pipe segment 26 by conventional means such as mechanical connectors 28 or welding. Additional tubular pipe segments 26, if any, are also joined end-to-end by conventional means such as mechanical connectors 28 or welding. The tubular pipe segments 26 extend substantially vertically downward as illustrated in FIG. 2. The tubular pipe segment 26 located farthest below the ocean's surface extends through the buoyancy tank 32 a sufficient distance below the lower end of the buoyancy tank 32 to permit the cable 38 to be connected to the tubular pipe segment 26 as further described below. The buoyancy tank 32 is connected to the tubular pipe segment 26 by such means as welding, bolting, or mechanical connectors. The buoyancy tank 32 compensates for at least a portion of the weight of the tether 14.

Figure 3:
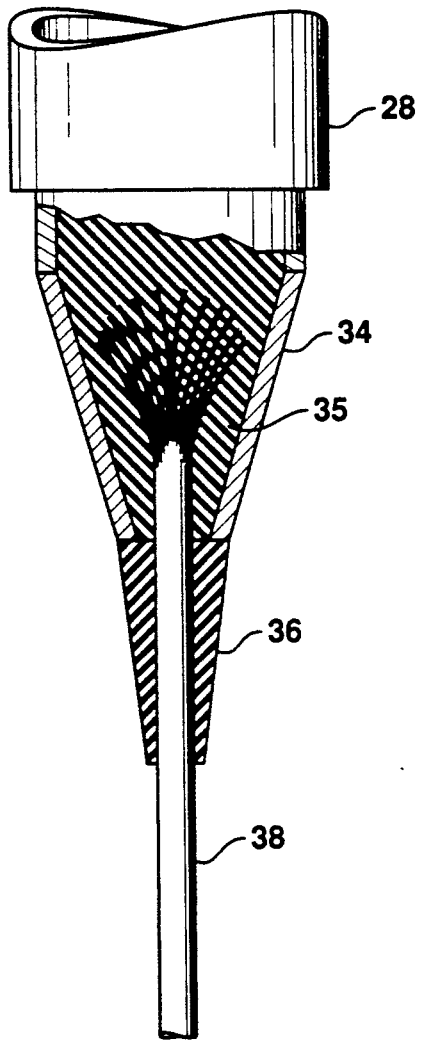
FIG. 3 illustrates a flex element used in connection with the present invention.

The lower end of the tubular pipe segment 26 is joined to the upper end of cable 38 by a mechanical connector 28, a cable socket 34 and a flex element 36, as illustrated in FIG. 3 and explained below. Similarly, the lower end of cable 38 (or of the bottom cable segment, as more fully described below) is joined to a bottom transitional piece 52 by a flex element 36, cable socket 34 and mechanical connector 28.

Each end of cable 38 is terminated with a flex element 36 and a cable socket 34 as illustrated in FIG. 3. The purpose of flex element 36 is to ensure that the portion of cable 38 entering cable socket 34 does not encounter excessive bending stresses. The flex element 36 is also known as a "bend limiter". Typically, the flex element 36 may be a rubber section or a curved metal section (not illustrated) designed to reduce bending stress where a cable terminates at a cable socket 34. The cable socket 34, also known as a "cable terminator", provides a receptacle to terminate the cable 38. The end of a cable 38 is pushed into the cable socket 34 and the strands of cable 38 are spread as shown in FIG. 3. The cavity 35 between the cable socket 34 and the cable 38 is filled with a composition designed to harden and form a solid mass with the cable 8 strands inside the cavity 35. For example, this material may be a resin or a moldable metal such as zinc. Other suitable hardening compositions will be known to those skilled in the art.

As shown in FIG. 2, a mechanical connector 28 is located on each end of cable 38. These mechanical connectors 28 are utilized to connect a first cable socket 34 to the tubular pipe segment 26 and a second cable socket 34 to the bottom transitional piece 52. A variety of mechanical connectors may be used in the present invention, as will be apparent to those skilled in the art. Mechanical connectors are connected to tubular sections by welding or may be threaded. One example is the Hunting Merlin connector manufactured by Hunting Oilfield Services Inc.

Figure 4:
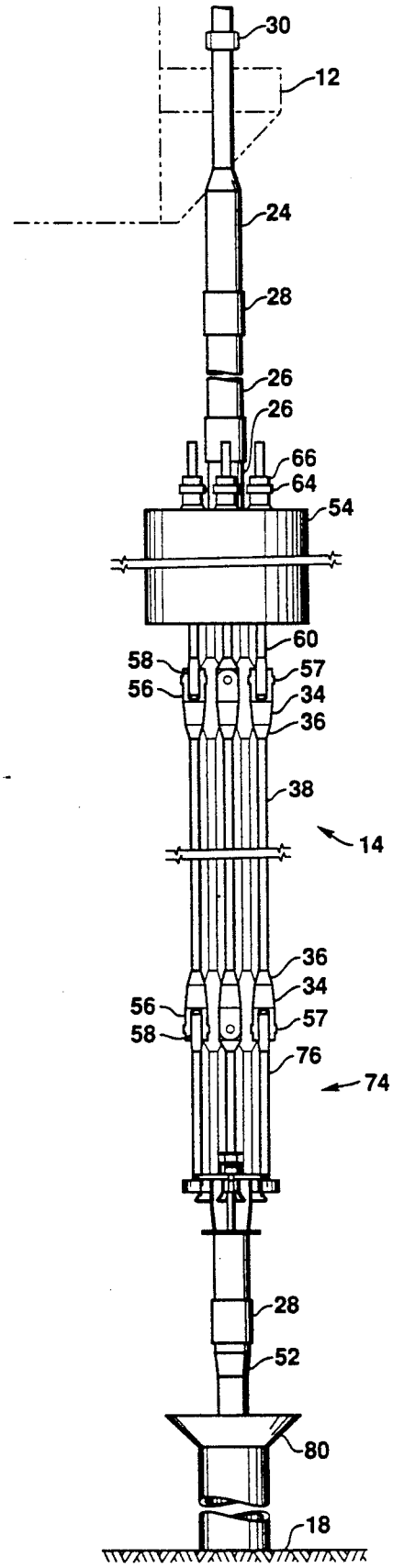
FIG. 4 illustrates the multiple cable embodiment of the present invention.

A multiple cable embodiment of the present invention is illustrated in FIG. 4. Each tether 14 includes a buoyancy tank 54 with a plurality of tension adjustment rods 60 of approximately equal length, a plurality of substantially parallel cables 38 of approximately equal length, and an attachment assembly 74 with a plurality of tension links 76. As described above for the single cable embodiment, the multiple cable embodiment also includes a top transitional piece 24, one or more tubular pipe segments 26, and a bottom transitional piece 52.

Figure 5:
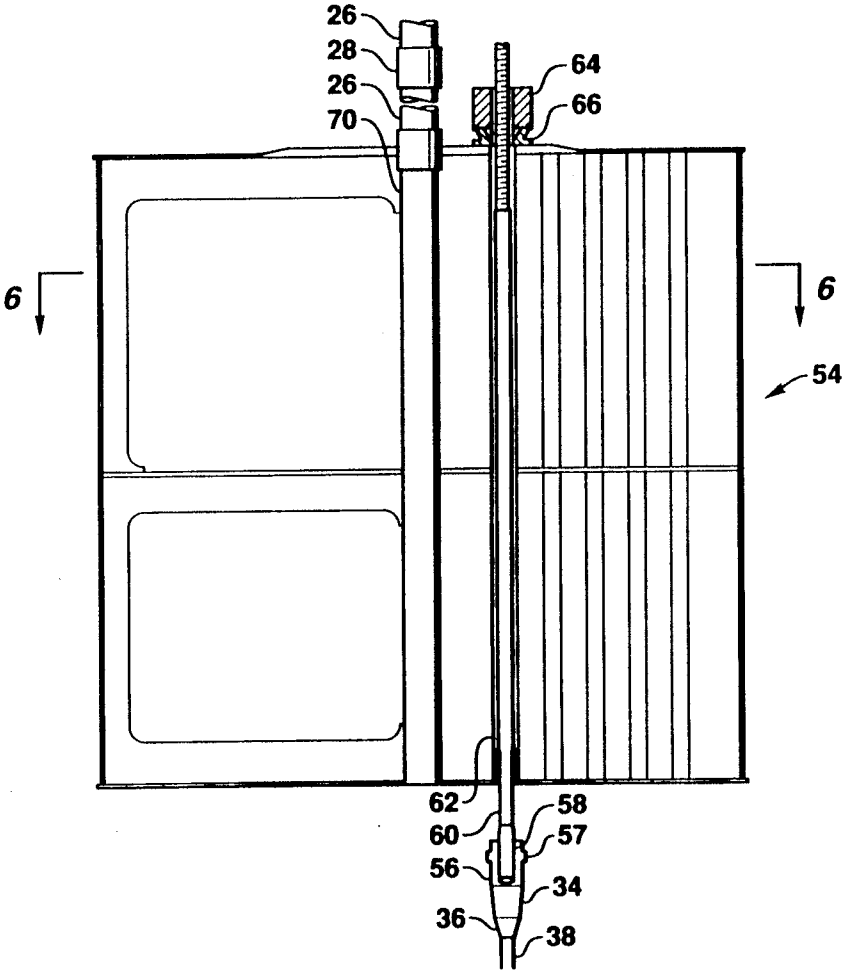
FIG. 5 is an elevation view, in partial section, of the buoyancy tank utilized with the multiple cable embodiment of the present invention.

The elevation view of the buoyancy tank 54 is illustrated in FIG. 5. The plurality of cables 38 are attached to the buoyancy tank 54 by a plurality of tension adjustment rods 60. Tension adjustment rods 60 extend through the buoyancy tank 54 via hawse pipes 62. Each tension adjustment rod 60 protrudes below the lower end of the buoyancy tank 54. As discussed above, both ends of each cable 38 are terminated using a flex element 36 and a cable socket 34 as illustrated in FIG. 3. Each cable socket 34 on each end of each cable 38 has a clevis 56. The lower end of each tension adjustment rod 60 has a padeye 58. Each tension adjustment rod 60 is connected to its respective cable 38 by connecting the padeye 58 to the clevis 56 with a pin 57.

Figure 6:
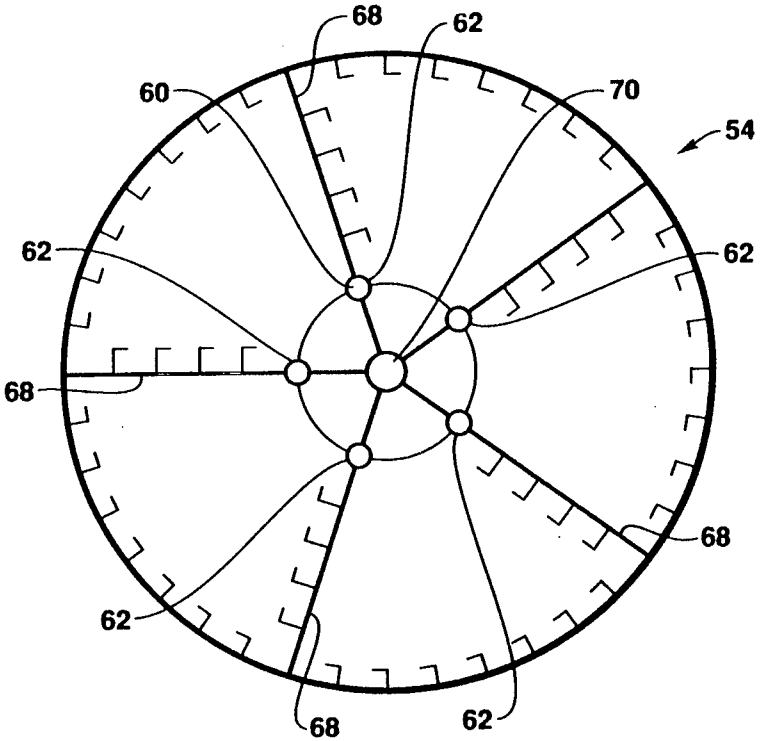
FIG. 6 is a plan view of the buoyancy tank taken along line 6—6 of FIG. 5.

FIG. 6 is the plan view of the buoyancy tank 54 which illustrates the location of the hawse pipes 62. Other arrangements will be obvious to persons skilled in the art. Each upper end of the plurality of tension adjustment rods 60 is connected to the buoyancy tank 54 by a tensioning mechanism located at the upper surface of the buoyancy tank 54. An example of a tensioning mechanism is a tension adjustment nut 64 for each tension adjustment rod 60 that runs down onto a load base 66 located on the upper surface of buoyancy tank 54 as shown in FIG. 5. Once each tension adjustment rod 60 is tensioned to the desired level, each tension adjustment nut 64 is tightened onto the load base 66. Radial bulkheads 68 (see FIG. 6) transfer cable loads from the hawse pipe 62 locations to a central tension member 70 of buoyancy tank 54. The central tension member 70 runs through the center of the buoyancy tank 54. The lowest tubular segment pipe 26 is joined to the central tension member 70 by such means as a mechanical connector 28, bolting or welding.

Figure 7:
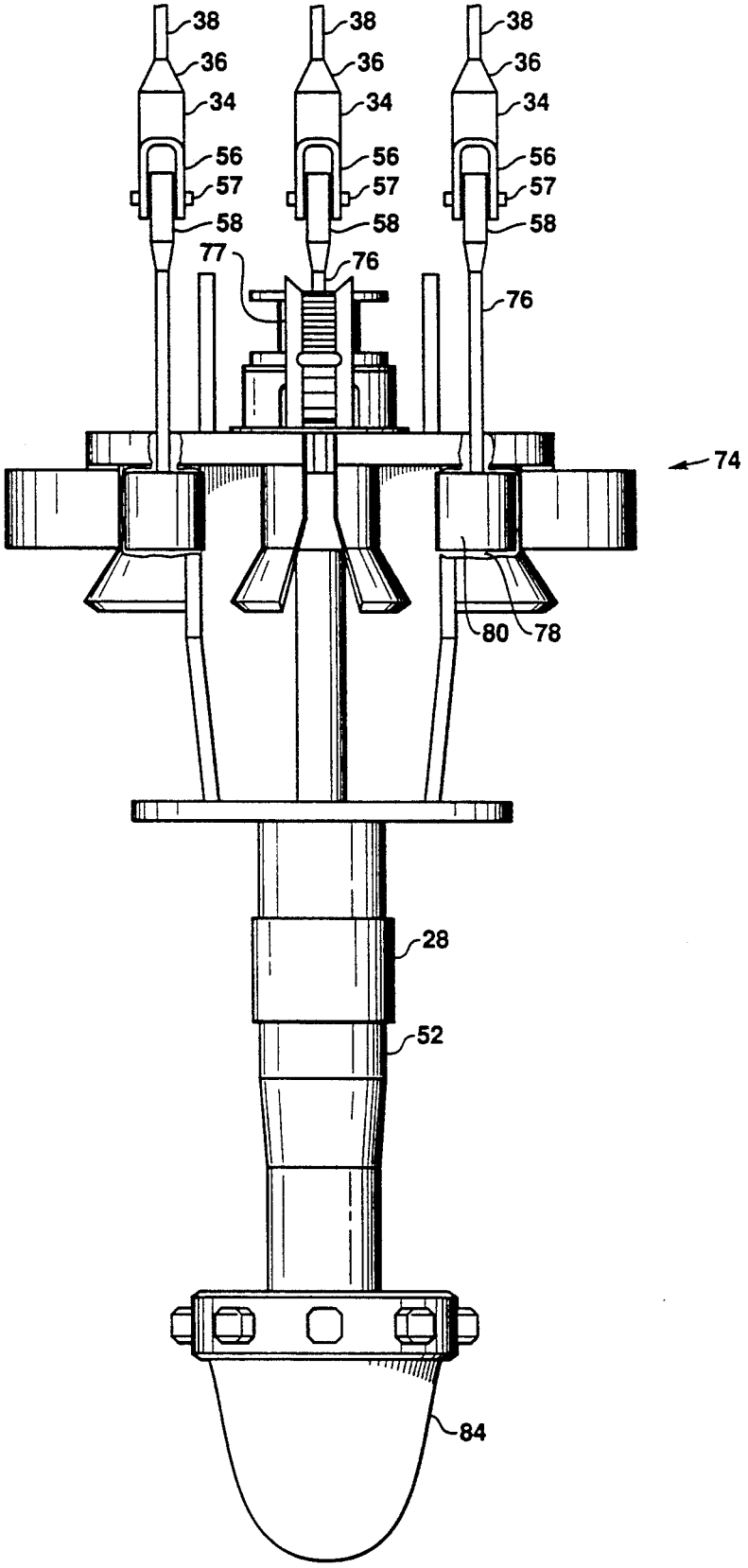
FIG. 7 is an elevation view of an attachment assembly for the multiple cable embodiment of the present invention.

The plurality of cables 38 is attached to the attachment assembly 74 as illustrated in FIGS. 4 and 7. The attachment assembly has a plurality of tension links 76. The number of tension links 76 corresponds to the number of cables 38. The upper end of each tension link 76 has a padeye 58. The cable socket 34 located on the lower end of each cable 38 is joined to a clevis 56. Each cable segment 38 is attached to the attachment assembly 74 by connecting the clevis 5 to the padeye 58 with a pin 57 as best illustrated in FIGS. 7 and 9.

Figure 9:
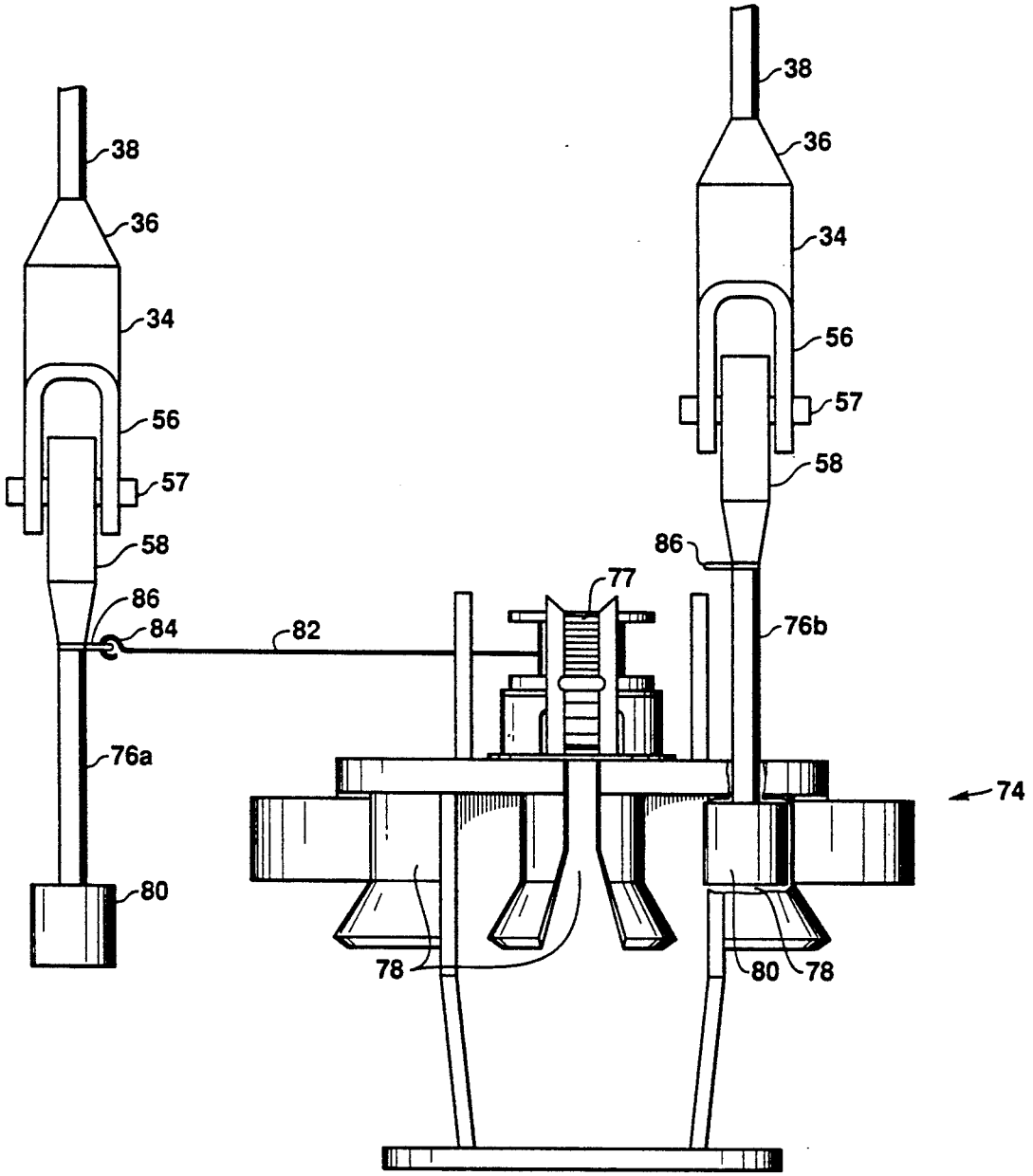
FIG. 9 illustrates the tension link, link receptacle, and pull-in winch of the attachment assembly of FIG. 7.

A pull-in winch 77 is permanently attached to the attachment assembly 74 as shown in FIGS. 7 and 9. The pull-in winch 77 is a hydraulically operated subsea winch. Suitable subsea winches will be apparent to those skilled in the art. The pull-in winch 77 has a hook 84 attached to the end of line 82 as illustrated in FIG. 9. The hook 84 is used to connect each tension link 76 to the pull-in winch 77. The pull-in winch 77 provides the lateral force necessary to pull each tension link 76 into its respective link receptacle 78 from the side of the attachment assembly 74.

FIG. 9 illustrates a tension link 76*a* prior to attaching the tension link 76*a* to the attachment assembly 74 and a tension link 76*b* that is attached to the attachment assembly 74. Each tension link 76 has an eyelet 86 and a lower end shaped like a bulb 80 as illustrated in FIG. 9. The bulb 80 is designed to fit inside the link receptacle 78. The tension link receptacles 78 provide a receptacle for each tension link 76.

Figure 8:
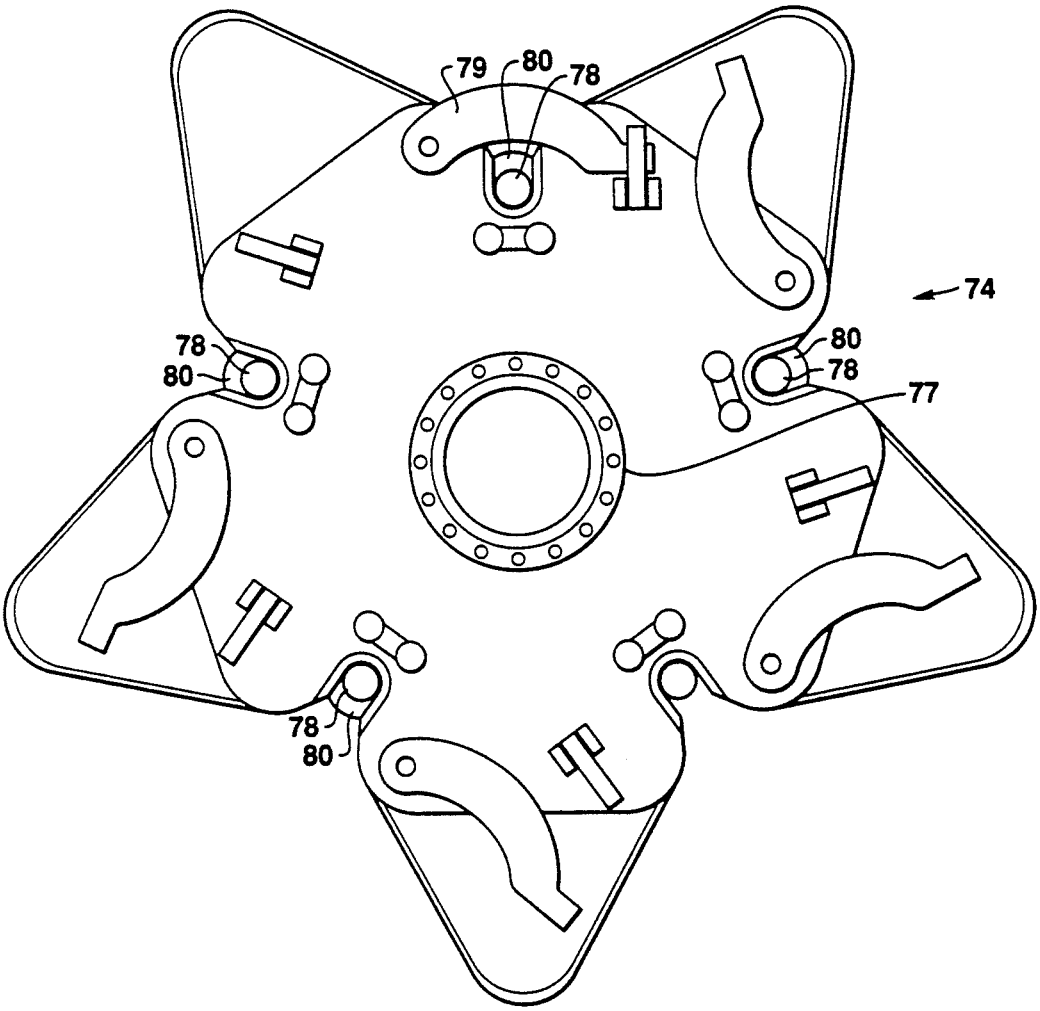
FIG. 8 is a plan view of the attachment assembly of FIG. 7.

As shown in FIG. 8, the upper portion of the link receptacle 78 is smaller than the bulb 80. When the cable segment 38 is in tension, the bulb 80 is held in place by the link receptacle 78 and the latch plate 79. The latch plate 79 prevents the tension link 76 from slipping out of the side of the link receptacle 78.

After each tension link 76 has been joined to its respective cable 38, each tension link is connected to its respective link receptacle 78. A remotely operated vehicle is used underwater to attach the hook 84 to the eyelet 86 on the tension link 76 as illustrated in FIG. 9. Thereafter, the pull-in winch 77 is activated, and laterally pulls the tension link 76 into the link receptacle 78. The tension link 76 is guided into the link receptacle 78 from the side of the attachment assembly 74 by the remotely operated vehicle. This procedure is repeated until each tension link 76 is in its respective link receptacle 78.

Once each tension link 76 is pulled into its respective link receptacle 78, a crane vessel is used to pull each cable 38 vertically towards the ocean's surface until the bulb 80 is pulled into the link receptacle 78. The latch plate 79 secures each tension link 76 in its respective link receptacle 78. The latch plate 79 is closed around the tension link 76 with the bulb 80 located beneath the latch plate 79. The attachment assembly 74 is joined to the bottom transitional piece 52 by a mechanical connector 28, or welding.

Except as explained above, the installation of the tethers 14 is by conventional means as known to those skilled in the art.

FIGS. 2 and 4 illustrate that each tether 14 is connected to the buoyant hull 12 and the foundation unit 18. The upper end of the top transitional piece 24 is connected to the buoyant hull 12 by a top connector 30. For example, one method is to use a solid load nut that runs down onto the load carrying structure (not illustrated). Other top connectors will be apparent to those skilled in the art. The bottom transitional piece 52 is joined to the foundation unit 18 by a tether bottom connector 84 such as the one illustrated in U.S. Pat. No. 4,907,914. Other suitable bottom connectors will be apparent to those skilled in the art.

Figure 10:
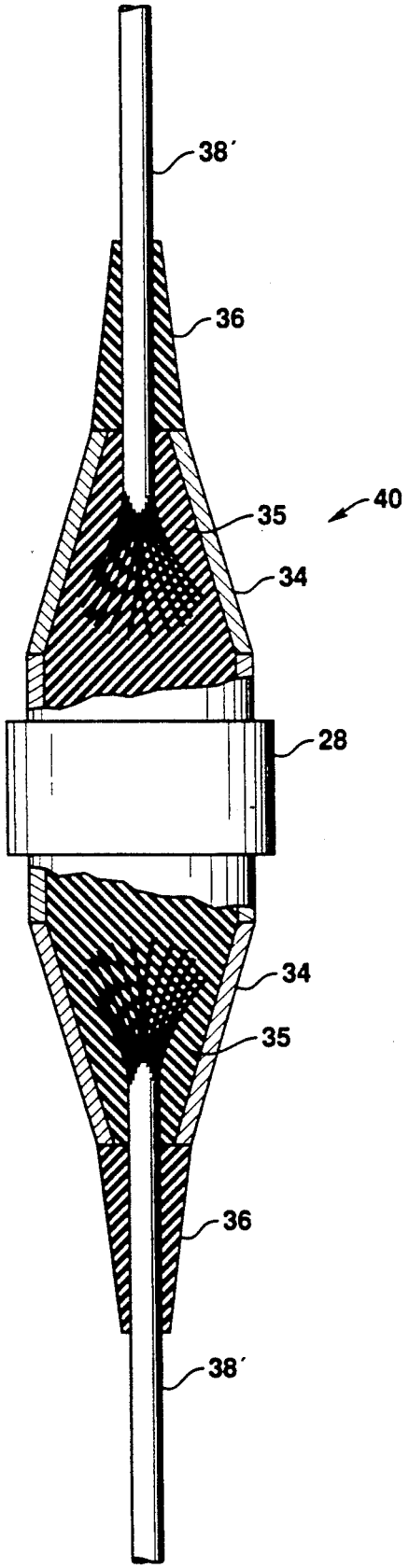
FIG. 10 illustrates a cable joining assembly that may be utilized in the present invention.

In the case of either embodiment presented above, when a TLP 10 is planned for deep water operations, the length of the cables 38 required may exceed current manufacturing capabilities with respect to the continuous length of a cable 38. In this case, two or more cable segments 38' may be joined from end to end by a cable joining assembly 40, as illustrated in FIG. 10. The cable joining assembly 40 includes two cable sockets 34, a mechanical connector 28 and two flex elements 36. A flex element 36 is connected to one end of each cable socket 34. A cable segment 38' passes through each flex element and is terminated within the cable socket 34. The cable sockets 34 are connected end-to-end by a mechanical connector as illustrated in FIG. 10. Other suitable cable joining mechanisms will be apparent to those skilled in the art.

As described above, the present invention satisfies the need for a tether which minimizes the necessity for connecting numerous segments of tubular piping, reduces the loads exerted on the tether and reduces the overall weight of the tether. However, this invention should not be unduly limited to the foregoing which has been set forth solely for illustrative purposes. Various modifications and alterations of the invention will be apparent to those skilled in the art without departing from the true scope of the invention as defined in the following claims.

What is claimed is:

1. An apparatus for securing a buoyant structure to a foundation unit on the ocean floor comprising:

a tether, said tether having (a) an upper tubular section having an upper end, a lower end, and a buoyancy tank, said buoyancy tank compensating for at least a portion of the weight of said tether; and (b) a cable having an upper end and a lower end; said upper end of said cable connected to said lower end of said upper tubular section;

means for attaching said upper end of said tether to said buoyant structure; and means for attaching said lower end of said tether to said foundation unit.

2. The apparatus of claim 1, wherein said cable further comprises:

a plurality of cable segments; and means for connecting said plurality of cable segments in end-to-end relationship.

3. The apparatus of claim 1, wherein said tether comprises:

an upper tubular section connected to said buoyancy tank;

a plurality of substantially parallel cables having substantially equal lengths; each said cable having an upper end and lower end; each upper end of each said cable connected to said buoyancy tank; and an attachment assembly having a lower end and an upper end; said upper end of said attachment assembly connected to said lower end of each said cable.

4. The apparatus of claim 3, wherein said attachment assembly further comprises:

a plurality of tension links, each said tension link having an upper end and a lower end, each upper end of each said tension link connected to said lower end of one of said cables;

a plurality of link receptacles, where each said lower end of each said tension link is connected to one of each said link receptacles.

5. The apparatus of claim 3, wherein each cable of the plurality of substantially parallel cables comprises:

two or more cable segments; and means for connecting said cable segments in end-to-end relationship.

* * * * *